United States Patent [19]

Hatlen

[11] Patent Number: 5,207,278
[45] Date of Patent: May 4, 1993

[54] TURF AERATOR

[75] Inventor: Richard P. Hatlen, Racine, Wis.

[73] Assignee: Textron Inc., Providence, R.I.

[21] Appl. No.: 867,486

[22] Filed: Apr. 13, 1992

[51] Int. Cl.$^5$ .............................................. A01B 45/02
[52] U.S. Cl. ..................................... 172/22; 267/150;
74/559; 172/21; 403/146
[58] Field of Search .................... 172/20-22,
172/347, 88, 89, 93, 711; 111/89; 267/150;
74/559; 403/120, 146

[56] References Cited

U.S. PATENT DOCUMENTS

| | | | |
|---|---|---|---|
| 1,988,756 | 1/1935 | Smith | 172/89 |
| 2,056,337 | 10/1936 | Archibald . | |
| 2,206,264 | 7/1940 | Rose | 172/21 |
| 2,348,101 | 5/1944 | Appel | 267/150 |
| 2,638,831 | 5/1953 | Ferguson et al. . | |
| 2,730,028 | 1/1956 | Oswalt | 172/21 |
| 2,988,161 | 5/1961 | Watson | 74/559 |
| 3,150,648 | 9/1964 | Gropp | 74/559 |
| 3,224,512 | 12/1965 | Alexander | 172/22 |
| 3,356,357 | 12/1967 | Levine | 267/150 |
| 3,986,562 | 10/1976 | Killion . | |
| 4,569,400 | 2/1986 | Minagawa et al. | 172/21 |
| 4,602,687 | 7/1986 | Hansen | 172/22 |
| 4,658,909 | 4/1987 | McDermott et al. . | |
| 4,750,565 | 2/1987 | Hansen et al. . | |
| 4,819,734 | 4/1989 | Classen . | |

OTHER PUBLICATIONS

Classen Manufacturing Aerator Parts (One page Top View drawing, and one page description).

Primary Examiner—Dennis L. Taylor
Assistant Examiner—Spencer Warnick
Attorney, Agent, or Firm—Arthur J. Hansmann

[57] ABSTRACT

An aerator which includes a ground-mobile support and an aerating mechanism pivotally mounted thereon. A rocker arm is mounted on the mechanism for inducing walking action to the tines, and a spring is imposed on the rocker arm for centering or neutralizing the arm when the tines are out of the ground.

12 Claims, 4 Drawing Sheets

TURF AERATOR

This invention relates to a turf aerator, and, more particularly, it relates to a ground-supported machine which advances over the ground and forms perforations in the turf.

BACKGROUND OF THE INVENTION

The prior art includes turf aerators which are mobile over the ground and form perforations in the ground when the machine advances on the ground. In various constructions of aerators, the aerator tines or perforators themselves operate in a variety of actions. That is, some are arranged to move into the ground at an advancing angle and then retract at a complimentary angle, like a person using a walking stick, and others are arranged to penetrate the ground in a closely vertical action to thereby provide only a minimum of upset or displacement of the turf adjacent the desired vertical hole. In all instances, the tines are positioned forwardly and then penetrate the ground and the machine is moved over the point of penetration and then the tine is retracted from the ground. Arrangements are made to move the retracted tine to a forward position where it can again penetrate the ground and repeat the perforating action.

Prior art mechanisms for actuating the tine include crankshaft systems for moving the tine up and down relative to the ground level, and also include springs for returning the tines to the forward position prior to penetrating the ground.

With regard to the present invention, even more significant is prior art which utilizes a walking-type principle where a pair of tines is arranged side-by-side such that when one tine is advanced and moved into the ground, the other tine is in a retracted position and ready to be advanced when the penetrating tine eventually moves rearwardly, all in a walking-type action created between the two tines which are going up and down and relatively forward and back. Examples of the walking-type of prior art aerator are shown in U.S. Pat. Nos. 2,638,831 and 4,750,565. Additionally, U.S. Pat. No. 2,638,831 shows a spring arrangement for returning the walking tine to a forward position, and also U.S. Pat. Nos. 3,986,562 and 4,658,909 show spring arrangements for returning the tine to the forward position ready to penetrate the ground.

In the prior art spring return systems, and in U.S. Pat. No. 4,750,565, there is no provision or arrangement for placing the walking tines in a centered or neutral position when they are free of the turf so that they can be placed in the optimum starting point of neutral positioning mentioned. Instead, the prior art tines are subject to the full force of the return spring, as mentioned in those patents, or they are subject to the linkage arrangement which inherently positions one tine only relative to the other tine and that may be in a forward and a rearward position, rather than in a centered or neutral position mentioned, as in U.S. Pat. No. 4,819,734.

Accordingly, the present invention improves upon the prior art by providing a turf aerator mechanism wherein the tines can be positioned in a centered or neutral position when they are free of the ground, and thereby provide for an optimum starting point for the aerating process.

Another object and advantage of this invention is to provide a turf aerator wherein the tines do utilize the walking principle so that they are in phase of forward and rearward action when one of the tines is penetrating the ground, and to accomplish this, the tines are mechanically interconnected to assure this action. Furthermore, the present invention provides for the neutral or center positioning of the tines when the tines are free of the ground, and such centering action is automatic and by virtue of a reliable and efficient arrangement which in actuality includes a single spring effective on both of the walking tines.

Still additionally, the present invention provides for the turf aerator with the walking principle for the tine and wherein the tines are guided in their vertical action by slots flanking the sides of each tine to thereby eliminate any requirement for mechanism which would guide the tines laterally of the fore and aft direction of machine movement such as is required in U.S. Pat. No. 4,750,565.

Somewhat more generally, the present invention provides a turf aerator which has a minimum of operating noise and wear, and also only a minimum of maintenance would be required to maintain the turf aerators of this invention, all because the apparatus for controlling the tines is simplified but yet most effective and provides for novel action, such as the centering and neutralizing mentioned above.

Other objects and advantages will become apparent upon reading the following description in light of the accompanying drawings.

DETAILED DESCRIPTION OF THE PREFERRED EMBODIMENT

Figure 1:
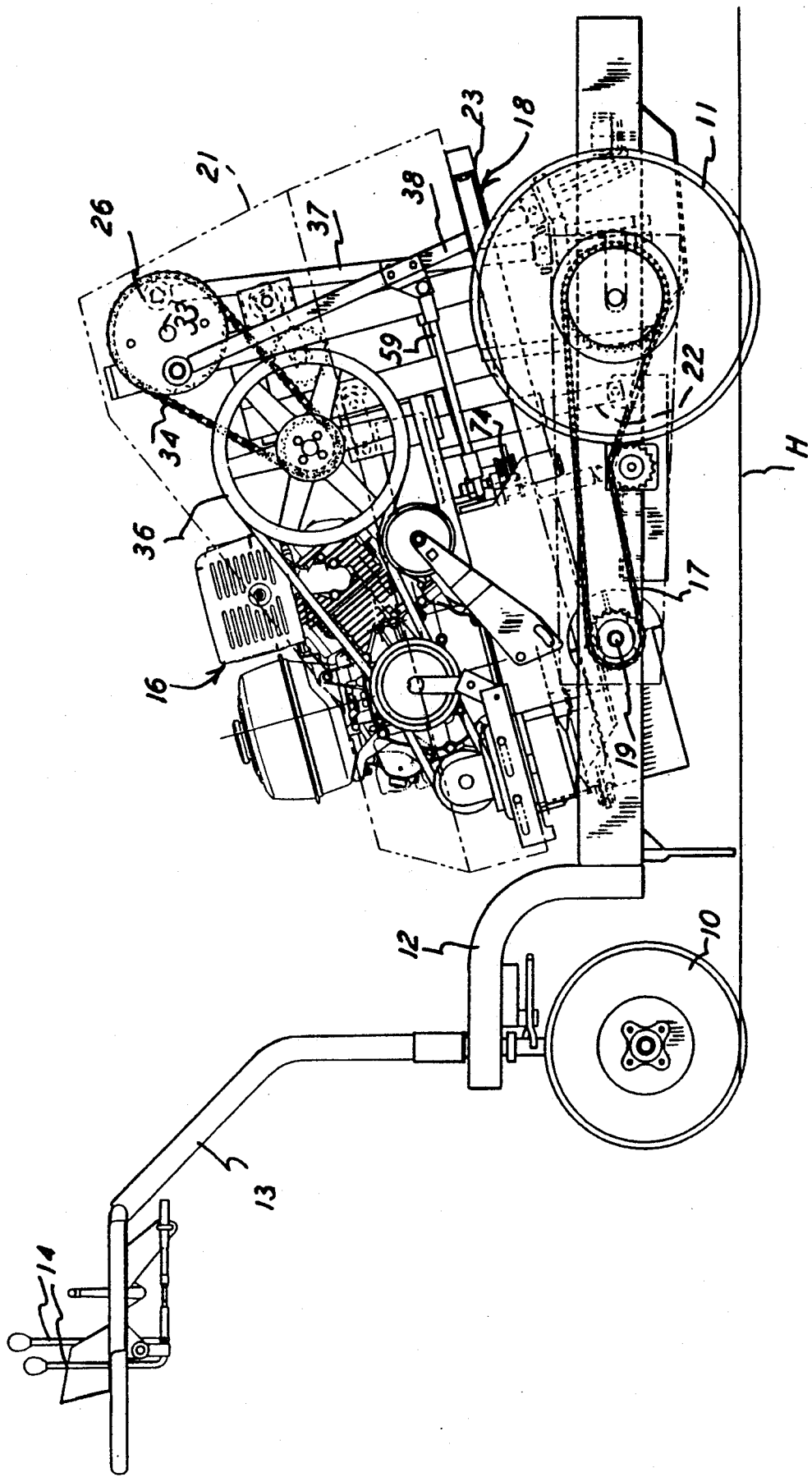
FIG. 1 is a side elevational view of an aerator of this invention.

FIG. 1 shows the invention applied to a walk-behind type of aerator, though it could also be used in a tractor-powered aerator. A horizon line H is shown, and ground wheels 10 and 11 are related thereto, and the frame 12 and attached handles 13 are shown. Operator controls 14 are shown at the rear of the unit. A gasoline-type engine 16 powers the entire unit and suitably drives the ground-drive chain 17 to mobilize the unit over the ground. An aerator frame, generally designated 18, is pivotally mounted on the main frame 12, such as at the interconnecting shaft 19. The dot-dash lines designated 21 indicate a hood covering the working mechanism of the aerator machine itself. To pivot the aerator mechanism frame 18 relative to the machine frame 12, a powered lift assembly 22 is shown interconnected between the two frames, and FIG. 1 shows the aerator mechanism frame front end 23 in the elevated position which is clear of the ground in the non-working position.

Figure 2:
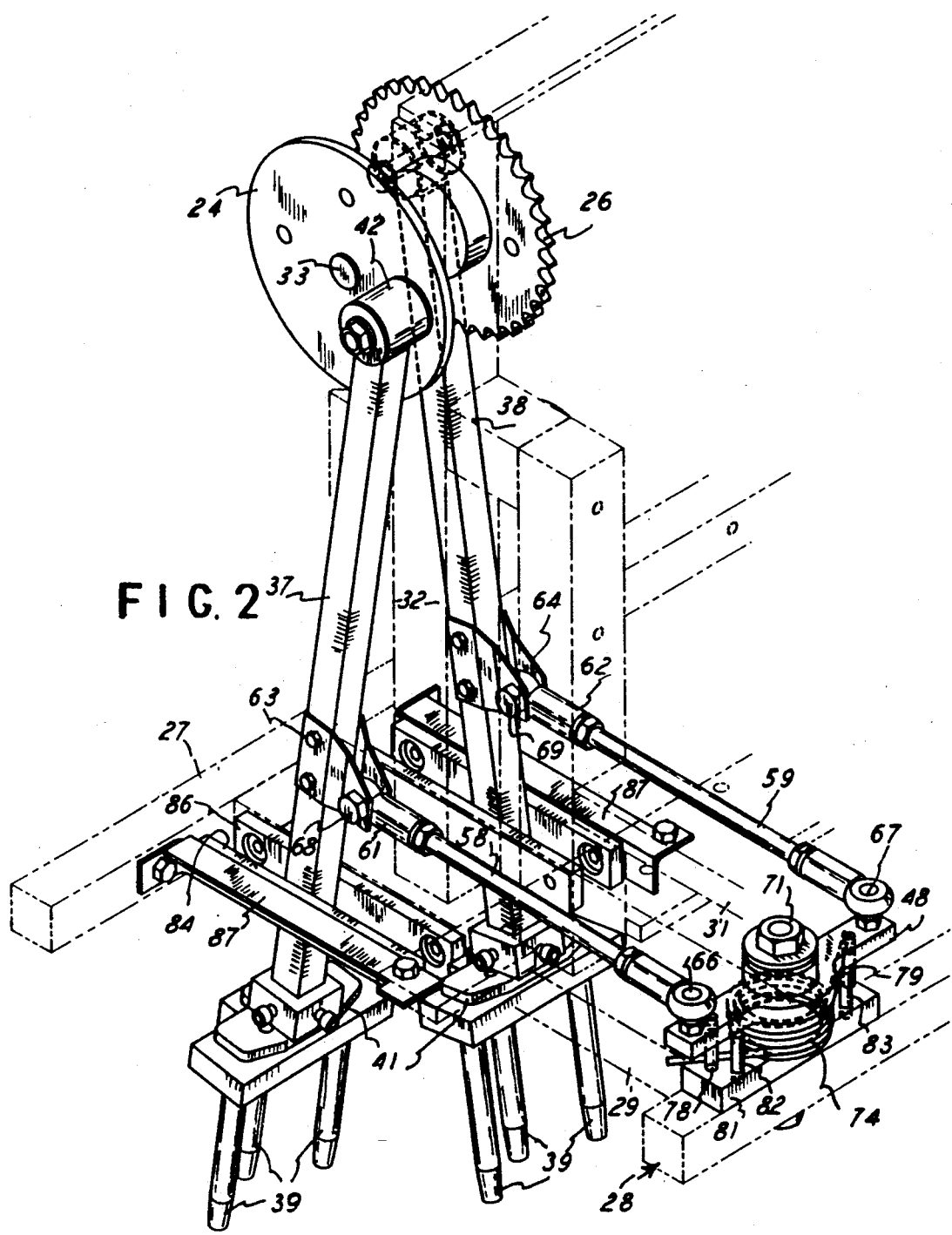
FIG. 2 is a left-rear perspective view of parts shown in FIG. 1, but being enlarged and with the parts in a different position.
Figure 3:
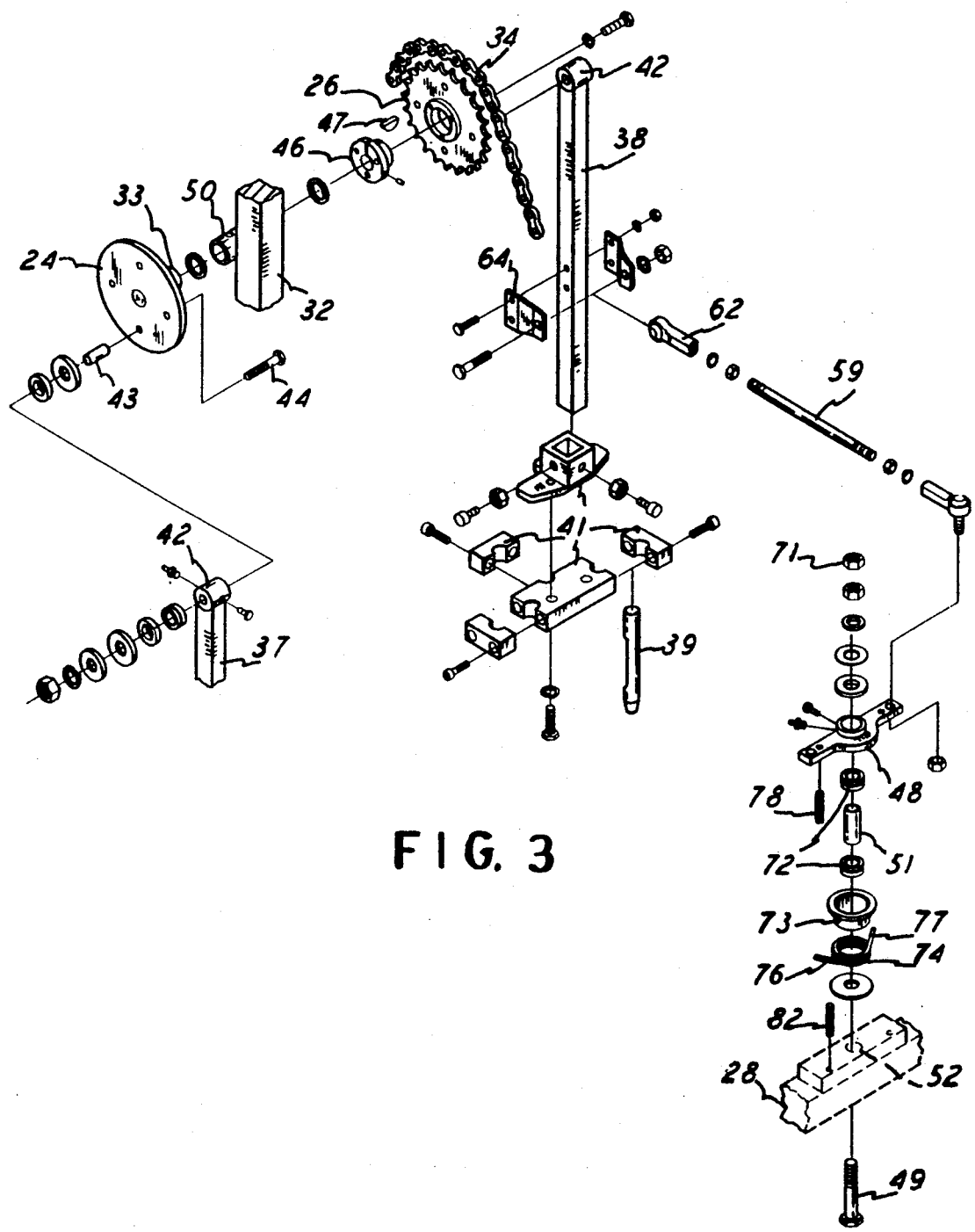
FIG. 3 is an exploded view of parts of FIG. 1 shown in perspective.

FIGS. 1, 2, and 3 show a crank assembly which includes a circular plate 24 and a sprocket 26, both of which are suitably rotatably mounted on and supported by the frame 18. Shown in dot-dash lines, are suitable horizontal aerator frame pieces 27 and 28, extending crosswise, and pieces 29, and 31, extending longitudinally, and a suitable uprightly extending piece 32 supports the rotational mounting of the crank plate 24 and the crank sprocket 26. The crank assembly 24 and 26 is rotatably mounted on the shaft 33 affixed to the crank plate 24.

It will of course also be noted that the sprocket 26 is driven by a chain 34 which is in turn powered off a pulley 36 rotated from the engine generally designated 16.

Accordingly, the aerator mechanism frame 18 is pivotal up and down, and carries with it the engine 16 and the parts shown in FIGS. 2 and 3.

FIGS. 1, 2, and 3, further show two generally vertically extending tine arms 37 and 38. These arms 37 and 38 constitute a pair, and the lower ends have three tubular tips 39 attached thereto. Tip mounting plates 41 interconnect the tine arms' 37 and 38 lower ends with the tips 39.

The upper ends of the tine arms 37 and 38 have cylindrical sleeves 42 affixed thereto. FIG. 3 shows that the sleeves 42 can be suitably crank-attached to the respective plate 24 and sprocket 26 by means of a sleeve 43 secured to the respective plate 24 and sprocket 26 by means of a respective bolt 44.

With the arrangement as described heretofore, it will be seen and understood that upon needed clockwise rotation of the plate 24 and sprocket 26, as viewed in FIGS. 2 and 3, the tine arms 37 and 38 will alternately move up and down in a crank action at the sleeves 42. Of course the plate 24 and the sprocket 26 are rotatably affixed together, such as through the shaft 33 and a hub 46 and a drive key 47, all supported off frame sleeve 50.

When the frame 18 is lowered from the FIG. 1 position, and is therefore in the operating position where the tips 39 will penetrate the ground, the crank action imposed on the upper ends of the tine arms 37 and 38 create a desirable "walking" aerating action because the arms 37 and 38 are connected at diametrically opposite locations relative to the crank shaft 33, and, in a manner hereinafter described, the arms 37 and 38 will advance and retract opposite to each other in that walking direction. In accomplishing the walking action, the tips 39 of arm 37, for instance, will sequentially engage the ground in a forward position, then penetrate the ground while the aerator advances forwardly, and then retract from the ground when the aerator moves beyond the point of penetration and removes a cylindrical plug of turf from the ground, in the aerating process, as desired.

To effect the walking action, the machine's main support frame piece 28 pivotally supports a rocker arm 48 which pivots about a vertical axis defined by a bolt 49 which extends through a sleeve 51 which is received in an opening 52 extending vertically through the frame piece 28 The rocker arm 48 has its opposite ends 53 and 54 articularly connected with the respective rearward ends 56 and 57 of rods or links 58 and 59. The respective forward ends 61 and 62 of the links 58 and 59 articularly connect with the respective tine arms 37 and 38 through plates 63 and 64 on each of the arms 37 and 38, as best shown in FIG. 2. Thus, the links 58 and 59 have vertical pivot axes 66 and 67, at the rear ends thereof, and they have horizontal pivot axes about the bolts 68 and 69, at the front ends of the links 58 and 59.

With this arrangement of the connection with the rocker arm 48 about its vertical axis defined by the bolt 49, it will be apparent that when the crank mechanism is operated, as described heretofore, then the tine arms 37 and 38 will undertake the alternate movement which is described as the walking action. FIG. 3 shows that the bolt 49 is secured by the nut 71, and there are intervening parts, including two bearing members 72 and there is a wear sleeve 73, along with washers and the like, all as shown, to complete the assembly of articularly mounting the rocker arm 48 about its vertical pivot axis on the main support frame piece 28. Also, a coiled torsion spring 74 is piloted on the sleeve 51 and spring 74 has oppositely extending ends 76 and 77 engaged with respective a pins 78 and 79 connected to and depending from the rocker arm ends 53 and 54, respectively. The support member 28 itself has a block 81 on top of member 28 and affixed thereto, and it has upstanding pins 82 and 83 on opposite sides of the spring 74 and in the path of the swinging movement of the respective spring ends 76 and 77. That is, the stationary pins 82 and 83 are stops which restrain the respective spring ends 76 and 77 from movement in the rearward direction of aerator movement and therefore permit spring 74 to be further wound.

With that arrangement, the rocker arm is free to pivot about its vertical axis, but is alternately influenced by the spring ends 76 and 77. The relationship is such that if the rocker arm were to move counter clockwise, from the position and as viewed in FIG. 4, then the arm pin 79 would likewise move and correspondingly move the spring end 77 counter clockwise. However, the spring end 76 which abuts the fixed pin 82 would not move counter clockwise though the arm pin 78 would so move.

Figure 4:
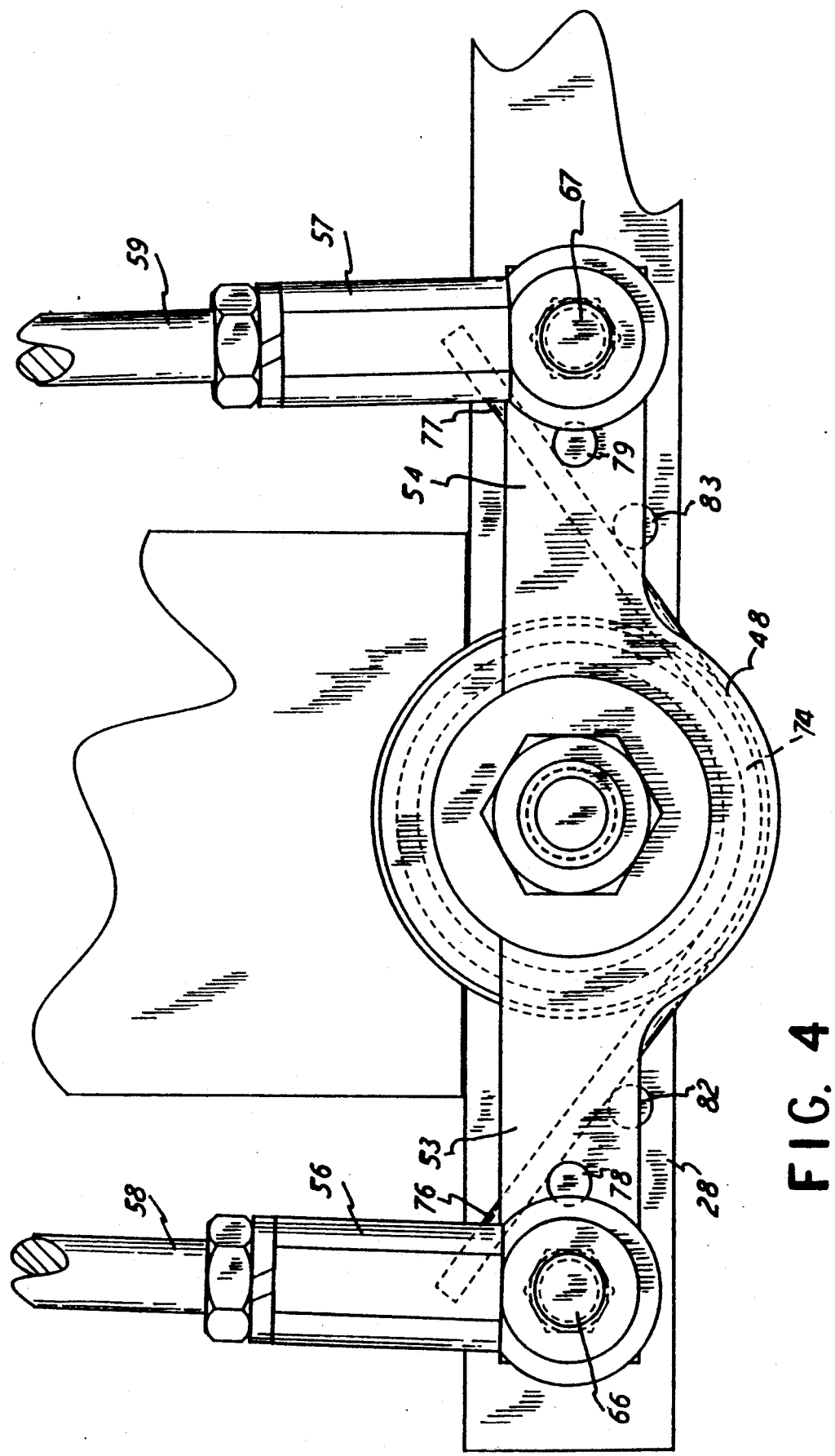
FIG. 4 is an enlarged top plan view of parts shown in FIGS. 1-3.

Importantly, when the tine tips 39 are free of the turf, then the torsion spring 74 is free to position the rocker arm 48 in its neutral position which is shown in FIG. 4 and this is of course achieved by the spring ends 76 and 77 applying equal force to the respective pins 78 and 79. This positions the aerating mechanism in the neutral or starting position which is desired. This means that the tine arms are in the proper starting position to yield a clean vertical hole prior to commencing aerating, and also each time the aerating mechanism is raised, the neutral position will be automatically achieved. This assures that the tines are properly timed prior to the start of each aerating pass. Further, if the tines are forced out of time by an obstacle in the ground, or if they lose contact with the ground during shallow aeration, again they will be brought to the desired neutral position in a FIG. 4.

In addition to inducing and controlling the walking action through the employment of the rocker arm 48, and in addition to the neutralizing of the tine arms, as mentioned, the tine arms 37 and 38 are guided laterally of the direction of movement, and they are so guided by means of anti-friction blocks 84 and 86 spaced apart but in snug relationship with the opposite sides of each tine arm 37 and 38, as shown in FIG. 2. These blocks 84 and 86 are suitably mounted on the aerating mechanism, such as being attached to the mounting plate 87, or the like. That is, the spacing apart of the anti-friction blocks 84 and 86, that is their face-to-face relationship of spacing, is such that they are essentially in light sliding contact with the opposite faces of the respective tine arms 37 and 38 to thereby give the tine arms complete lateral support and guidance while permitting free movement of the tine arms 37 and 38 up and down between the anti-friction blocks 84 and 86 which define guide slots for the tines 37 and 38.

FIG. 4 shows that the rearward ends 56 and 57 of the rods 58 and 59 are threadedly engaged with the main portions of the arms 58 and 59 so that the overall lengths of the respective arms 58 and 59 can be extended, and this is also true of the forward arm ends 61 and 62, and thus the extent of the walking stride can be altered.

What is claimed is:

1. A turf aerator comprising a ground-mobile support, two aerator tines movably mounted on said support for penetrating the turf, a mechanism mounted on said support and connected to said tines for vertically simultaneously reciprocating said tines in opposite vertical directions, mounting post means mounted on said support and presenting a vertical axis, a rocker arm mounted on said mounting post means for rocking motion from a centered position and about said vertical axis and including two ends extending to opposite sides of said axis, a link connected between each respective one of said tines and a respective one of said ends of said rocker arm to thereby produce a walking action in response to movement of said support over the ground and alternate penetration of the turf by said tines whereby each said end of said rocker arm alternately moves with one of said tines forward and rearward during the walking action, coiled torsion spring means coincident with said mounting post means, said torsion spring means having opposite ends which respectively force against and move with said ends of said rocker arm for yieldingly urging said rocker arm to a centered position relative to the aforesaid forward and rearward action of said ends of said rocker arm, to thereby center said rocker arm and said tines when the latter are free of the turf, and including a stop on said support in the respective path of movement of each of said spring ends for restraining said spring ends from moving beyond said stops, and thereby accommodate the application of torque to said spring in response to the aforesaid forward and rearward action of said ends of said rocker arm.

2. The turf aerator as claimed in claim 1, including guide slots in said support and receiving said tines in frictional contact for guiding said tines in their vertical reciprocating action.

3. The turf aerator as claimed in claim 1, wherein said coiled torsion spring means is in only one length, is coincident with said mounting post means in only one circular direction and has both said opposite ends of said spring means extending tangentially from the remainder of said spring means.

4. The turf aerator as claimed in claim 3, wherein said mounting post means includes a fixed post and a sleeve rotatable on said post, and said spring means being in contact with said sleeve for insulating said fixed post from direct contact with said spring means.

5. The turf aerator as claimed in claim 11, wherein said mounting post means includes a fixed post and a sleeve rotatable on said post, and said spring means being coincident with and contact with said sleeve for insulating said fixed post from direct contact with said spring means.

6. The turf aerator as claimed in claim 1, wherein each of said spring ends respectively engages said rocker arm end at a first location along said spring end spaced from said vertical axis, and each of said stops is respectively located in a position on said support for contacting said spring ends in a location intermediate said vertical axis and said first location along said spring ends.

7. A turf aerator comprising a ground-mobile support having a horizontal upper surface, ground aerating mechanism pivotally mounted on said support for pivotal movement downwardly to a ground-penetrating operative position and for pivotal movement upwardly to a ground-clearance inoperative position, two aerator tines movably mounted on said aerating mechanism for penetrating the turf, a crank mechanism mounted on said support and connected to said tines for vertically simultaneously reciprocating said tines in opposite vertical directions, pivot post means mounted on said horizontal surface of said support and extending above said surface and having a vertical axis, a rocker arm mounted on said pivot post means for rocking motion from a centered position about said vertical axis and relative to said pivot post means, a link connected between each respective one of said tines and a respective one of the ends of said rocker arm to thereby produce a walking action in response to movement of said support over the ground and alternate penetration of the turf by said tines whereby each said end of said rocker arm alternately moves with one of said tines forward and rearward during the walking action when said aerating mechanism is in the operative position, coiled torsion spring means coincident with said pivot post means with said spring means having opposite ends respectively yieldingly urging against said ends of said rocker arm for yieldingly urging said rocker arm to the centered position, and including a stop on said surface in the respective path of movement of each of said spring ends for restraining said spring ends from moving beyond said stops to thereby apply torque to said spring means in response to the aforesaid movement of said ends of said rocker arm and to thereby center said rocker arm and said tines when said aerating mechanism is in the inoperative position.

8. The turf aerator as claimed in claim 7, wherein said coiled torsion spring means is in only one length, is coincident with said mounting post means and has both said opposite ends of said spring means extending tangentially from the remainder of said spring means.

9. The turf aerator as claimed in claim 8, wherein said mounting post means includes a fixed post and a sleeve rotatable on said post, and said spring means being coincident with and contact with said sleeve for insulating said fixed post from direct contact with said spring means.

10. The turf aerator as claimed in claim 7, wherein said mounting post means includes a fixed post and a sleeve rotatable on said post, and said spring means being coincident with and contact with said sleeve for insulating said fixed post from direct contact with said spring means.

11. The turf aerator as claimed in claim 7, wherein each of said spring ends respectively engages said rocker arm end at a first location along said spring end spaced from said vertical axis, and each of said stops is respectively located in a position on said support for contacting said spring ends in a location intermediate said vertical axis and said first location along said spring ends.

12. The turf aerator as claimed in claim 7, including guide slots in said aerating mechanism and receiving said tines in sliding frictional contact therewith for guiding said tines in their vertical reciprocating action, and said spring means is arranged to overcome the resistance of said frictional contact during the urging of said rocker arm to the centered position.

* * * * *

UNITED STATES PATENT AND TRADEMARK OFFICE
CERTIFICATE OF CORRECTION

PATENT NO. : 5,207,278
DATED : May 4, 1993
INVENTOR(S) : Richard P. Hatlen

It is certified that error appears in the above-identified patent and that said Letters Patent is hereby corrected as shown below:

Col. 4, line 46, delete "a"
Col. 5:
Claim 3, line 3, delete "in only one circular direction";

Claim 4, line 3, after "being" read --coincident with and--;

Claim 5, line 1, "claim 11" should read "claim 1".

Signed and Sealed this

Twenty-eighth Day of December, 1993

Attest:

BRUCE LEHMAN

Attesting Officer  Commissioner of Patents and Trademarks